United States Patent
Geiman (10) Patent No.: US 9,856,962 B2
(45) Date of Patent: *Jan. 2, 2018

(54) FORGED COMPOSITE POWDER METAL PART AND METHOD OF MAKING SAME

(75) Inventor: Timothy E. Geiman, South Lyon, MI (US)

(73) Assignee: GKN Sinter Metals, LLC, Auburn Hills, MI (US)

( * ) Notice: Subject to any disclaimer, the term of this patent is extended or adjusted under 35 U.S.C. 154(b) by 1401 days.

This patent is subject to a terminal disclaimer.

(21) Appl. No.: 13/524,755

(22) Filed: Jun. 15, 2012

(65) Prior Publication Data

US 2012/0297911 A1 Nov. 29, 2012

Related U.S. Application Data

(60) Continuation-in-part of application No. PCT/US2010/060066, filed on Dec. 13, 2010, which
(Continued)

(51) Int. Cl.
*B22F 3/12* (2006.01)
*B22F 3/17* (2006.01)
(Continued)

(52) U.S. Cl.
CPC ............... *F16H 55/06* (2013.01); *B21K 1/30* (2013.01); *B22F 3/12* (2013.01); *B22F 3/17* (2013.01);
(Continued)

(58) Field of Classification Search
CPC .. B22F 3/12; B22F 3/1208; B22F 3/16; B22F 3/162; B22F 3/17; B22F 3/172;
(Continued)

(56) References Cited

U.S. PATENT DOCUMENTS 3,206,996 A 9/1965 Shimp
3,398,444 A 8/1968 A.S. Nemy
(Continued)

FOREIGN PATENT DOCUMENTS

DE 1170149 B 5/1964
DE 10331631 B3 1/2005
(Continued)

OTHER PUBLICATIONS

International Search Report dated Apr. 3, 2008 for related PCT application PCT/US2007/076182 filed Aug. 17, 2007.
(Continued)

*Primary Examiner* — Scott Kastler
*Assistant Examiner* — Vanessa Luk
(74) *Attorney, Agent, or Firm* — Quarles & Brady LLP (57) ABSTRACT

A forged composite powder metal part, such as a CVJ inner race or bevel gear, and method of making the same are disclosed. The forged composite powder metal part includes a outer section concentrated with a first powder metal material, a inner section concentrated with a second powder metal material and a variable boundary profile between the materials of the two sections. For example, in a forged CVJ inner race, the different materials can provide improved wear resistance in the ball tracks and improved spline performance. As another example, in a forged bevel gear, the different materials can be used to create a continuous variable boundary profile that defines the depth of a harder layer over the teeth.

14 Claims, 7 Drawing Sheets

Related U.S. Application Data is a continuation-in-part of application No. 12/852,856, filed on Aug. 9, 2010, now Pat. No. 8,424,204, which is a division of application No. 11/277,374, filed on Mar. 24, 2006, now abandoned.

(60) Provisional application No. 61/286,642, filed on Dec. 15, 2009.

(51) Int. Cl.

| | | |
|---|---|---|
| *B22F 5/08* | (2006.01) | |
| *B22D 7/02* | (2006.01) | |
| *F16H 55/06* | (2006.01) | |
| *B21K 1/30* | (2006.01) | |
| *B22F 7/02* | (2006.01) | |
| *F16H 55/17* | (2006.01) | |

(52) U.S. Cl.
CPC . *B22F 5/08* (2013.01); *B22F 7/02* (2013.01); *F16H 55/17* (2013.01); *Y10T 74/1987* (2015.01)

(58) Field of Classification Search
CPC ...... B22F 3/177; B22F 2003/174; B22F 5/08; B22F 5/085; B22F 5/10; B22F 5/103; B22F 5/106; B22F 2005/103; B22F 7/02; B22F 7/06; B22F 2007/01; B22F 2007/07; B22F 2303/40
See application file for complete search history.

(56) References Cited

U.S. PATENT DOCUMENTS

| | | |
|---|---|---|
| 3,703,108 A | 11/1972 | McCaw |
| 3,768,327 A | 10/1973 | Dunn et al. |
| 4,054,449 A * | 10/1977 | Dunn .................. B22F 7/00 419/6 |
| 4,165,243 A | 8/1979 | Sarnes et al. |
| 4,939,829 A * | 7/1990 | Maki .................. B21K 1/30 29/893.34 |
| 5,390,414 A | 2/1995 | Lisowsky |
| 5,718,774 A | 2/1998 | Tukamoto et al. |
| 5,903,815 A | 5/1999 | Scott |
| 5,934,157 A | 8/1999 | Kobayashi et al. |
| 6,148,685 A | 11/2000 | Cadle et al. |
| 6,626,576 B1 | 9/2003 | Cadle et al. |
| 8,424,204 B2 * | 4/2013 | Geiman .................. B21K 1/30 148/206 |
| 2005/0085331 A1 | 4/2005 | Prucher |
| 2007/0221005 A1 | 9/2007 | Geiman |

FOREIGN PATENT DOCUMENTS

| | | |
|---|---|---|
| EP | 0371340 B1 | 6/1990 |
| GB | 618009 | 2/1949 |
| WO | 2008/100811 | 8/2008 |
| WO | 2008/124378 | 10/2008 |

OTHER PUBLICATIONS

The International Search Report dated Feb. 11, 2011 for International Application No. PCT/US2010/060066.

* cited by examiner

FORGED COMPOSITE POWDER METAL PART AND METHOD OF MAKING SAME

CROSS-REFERENCE TO RELATED APPLICATIONS

This application is a continuation-in-part of PCT international patent application no. PCT/US2010/060066 filed on Dec. 13, 2010 which claims priority to U.S. provisional patent application No. 61/286,642 filed on Dec. 15, 2009 and this application is a continuation-in-part of U.S. non-provisional patent application Ser. No. 12/852,856 filed on Aug. 9, 2010 which is a divisional application of U.S. non-provisional patent application Ser. No. 11/277,374 filed on Mar. 24, 2006. The full contents of these applications are incorporated by reference as if set forth in its entirety herein for all purposes.

TECHNICAL FIELD

The invention relates to a forged powder metal part. In particular, this invention relates to a composite forged powder metal part and a method of manufacture thereof.

BACKGROUND

There is continuing demand for manufacturing processes that may lessen the cost, time or steps in producing a part. More often than not, the benefits resultantly associated with improving the manufacturing process are necessitated in the first instance by customer requirements to develop and improve products to have superior dimensional, mechanical and/or performance properties.

For instance, a typical bevel gear such as a differential side gear used for torque transfer and reduction at the differential end of a vehicle wheel axle or drive shaft may have any or all of the following performance requirements: the spline area requires dimensional precision, high shear strength and brinnelling resistance; the hub and thrust faces requires dimensional precision, surface finish and case compatibility; the gear geometry requires dimensional precision, surface finish and optimised profile; and the tooth and core strength may require impact resistance, wear resistance, spalling resistance, and different surface and core metallurgies.

Figure 8:
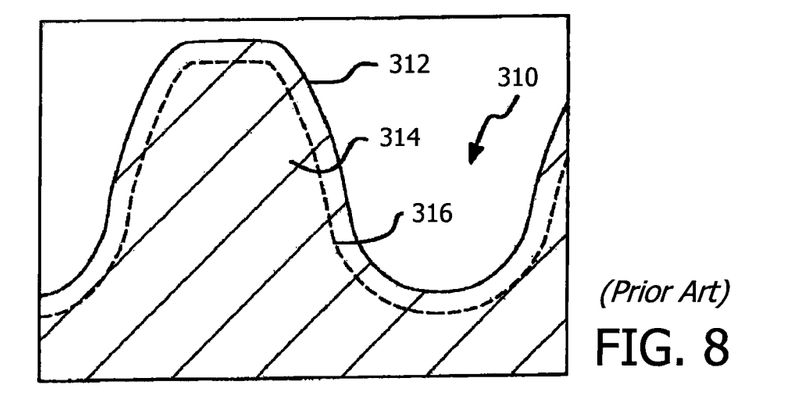
FIG. 8 shows a partial cross-sectional view of a case carburized gear according to the prior art.

Referring to FIG. 8, in order to meet some of these performance requirements, a gear 310 has typically been made by forging a powder metal 314 and then case carburizing the gear 310 to achieve a nearly constant effective case depth 316. The case depth 316 for each gear tooth 312 is shown in the partial cross-sectional view of FIG. 8. However, a case carburized gear does not necessarily achieve the desired mechanical properties such as enhanced tooth wear and fatigue strength while providing beneficial performance characteristics in the body of the gear.

As another example, a constant velocity joint (CVJ) is a torque transfer shaft coupling that is widely used in vehicle wheel drive shafts to transmit power through a variable angle from a first rotating shaft to a second rotating shaft. One type of CVJ includes (1) an inner race having an inner spline and an outer surface with ball tracks, (2) an outer joint part also having ball tracks, and (3) bearing balls located between the ball tracks of the inner race and outer joint part.

Figure 1:
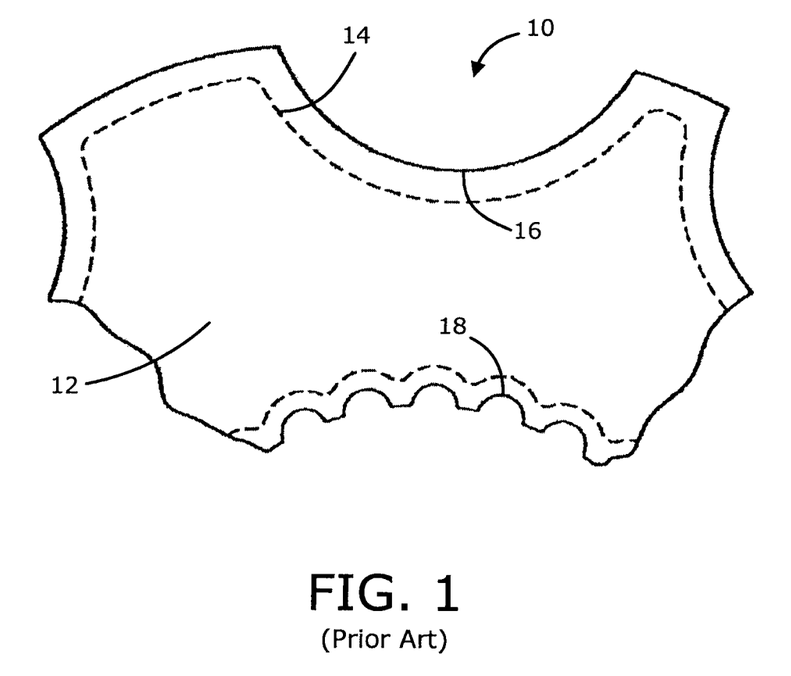
FIG. 1 shows a partial cross-sectional view of a case carburized CVJ inner race according to the prior art.

With reference to FIG. 1, a conventional CVJ inner race 10 is made by cold forming, forging, and then case carburizing a metal 12 to achieve a nearly uniform effective case depth 14. The case depth 14 for each of the ball tracks 16 and the splines 18 are indicated by the dashed lines in the partial cross-sectional view of FIG. 1. The processing parameters to achieve a nearly uniform carburization of a fully dense part of a specific hardness, case depth and carbon gradient are generally known. Secondary operations, such as machining and grading, may be performed to ensure dimensional accuracy of the various features of the inner race 10.

Unfortunately, a nearly uniform case depth does not necessarily achieve the desired mechanical properties for a CVJ inner race or a bevel gear. Although a relatively deep hardened area in the ball tracks or gear teeth is beneficial to provide a robust load bearing zone and prevent wear, spalling, or brinnelling during use, it is less desirable to have a hardened spline area. If the area around the splines is hardened, then it will be difficult to machine the splines in a cost-effective way to obtain the required dimensional tolerances.

Therefore, there is a need for an improved powder metal parts. In particular, there is a need for torque transfer powder metal parts used in vehicle wheel drive lines that have different properties in different regions of the part.

SUMMARY OF THE INVENTION

A method of making a forged composite powder metal part from at least two different powder metal materials is disclosed. A composite preform compact is formed from the at least two different powder metal materials by filling a first portion of a compaction form with a first powder metal material, filling a second portion of the compaction form with a second powder metal material, and compacting the first powder metal material and the second powder metal material in the compaction form to form the composite preform compact. The first powder metal material at least partially forms an outer surface in a higher concentration than the second powder metal material. The second powder metal material at least partially forms a pre-forged core in a higher concentration than the first powder metal material. Once the powder metal compact is compacted, the composite preform compact is sintered and forged to form the forged composite powder metal part. The forged composite powder metal part has an outer section comprising the first powder metal material in a higher concentration than the second powder metal material. A plurality of axially-inclined features (e.g., bevel gear teeth or races and lands) are forged in a portion of the outer section. An inner section comprises the second powder metal material in a higher concentration than the first powder metal material.

In one form, the forged composite powder metal part may be an inner race for a constant velocity joint. In this form, the step of compacting can include forming a plurality of pre-forged ball tracks in the outer surface of the compaction preform compact. Then, during forging, the plurality of pre-forged ball tracks in the outer surface of the compaction preform compact can be formed into a plurality of the ball tracks with land surfaces there between in the outer section of the composite powder metal part. In subsequent post-forging processing steps, the plurality of the ball tracks might be machined (for example, to remove flash or to ensure correct final dimensions) and a splined area of the inner section may be cold sized.

In another form, the forged composite powder metal part may be a bevel gear having an axis of rotation that extends through an axially-extending opening in the composite powder metal part. During forging, a plurality of teeth can be formed into the outer section of the forged composite powder metal part in which the teeth are, at least in part, angularly inclined toward the axis of rotation.

The inner section and the outer section of the forged composite powder metal part may have different hardness properties. In one example, the first powder metal material can have a greater hardenability than the second powder metal material. If this is the case, then quenching the forged composite powder metal part after forging may be used to achieve the different hardness properties between the outer section and the inner section of the forged composite powder metal part. In another example, the first powder metal material may have a greater carbon content than the second powder metal material. In still another example, the part may be carburized before forging, either during or after sintering. During carburizing, at least a portion of the pre-forged core may be masked such that a resultant case depth in the outer surface exceeds a resultant case depth in the pre-forged core before forging.

During the step of compacting, an axially-extending opening may be formed in the pre-forged core of the composite preform compact. In this case, then the step of forging the composite preform compact may form a splined surface in the axially-extending opening.

The step of forging may create a variable boundary profile between the inner section and the outer section in which a radial distance from an axis of rotation of the forged composite powder metal part to the variable boundary profile varies over an axial length of the forged composite powder metal part.

A forged composite inner race for a constant velocity joint can be made by the above-described method. The forged composite inner race may include a plurality of ball tracks formed on the outer section with corresponding lands between adjacent ball tracks. The forged composite inner race may also include an axially-extending splined opening formed in the inner section.

Again, the first powder metal material of the outer section may have a greater hardness than the second powder metal material of the inner section. For example, the first powder metal material may have a greater hardenability than the second powder metal material or the first powder metal material has a higher carbon content than the second powder metal material.

In one form of the inner race, the composite preform compact may be carburized to provide an essentially constant case depth in an outer surface of a composite preform compact and then the composite preform compact is forged to provide a case depth that is greater in the ball tracks than in the lands in the forged composite inner race.

The forged composite inner race may have a variable boundary profile formed between the outer section and the inner section in which a distance from the axis of rotation of the forged composite inner race to the variable boundary profile varies over an axial length of the forged composite inner race.

A forged composite bevel gear can be made by the above-described methods. The forged composite bevel gear can include a gear core formed in the inner section in which the gear core defines a rotational axis. A plurality of teeth may be formed on the outer section and extend from the gear core. The plurality of teeth can extend in the same general direction as the rotational axis of the gear core, but also be inclined with respect to the rotational axis of the gear core. Again, the outer section can comprise the first powder metal material in a higher concentration than the second powder metal material.

The first powder metal material may at least partially form the plurality of teeth and the second powder metal material may form the gear core and may partly form a core of said plurality of teeth. The first powder metal material and the second powder metal material may be sintered and forged to form a continuous variable boundary profile between the first powder metal material and second powder metal material.

In one particular form, a depth of the continuous variable boundary profile may be greater at a tooth tip than at least one corresponding tooth root and such that a depth of the continuous variable boundary profile at a location between the tooth tip and a corresponding tooth root is less than the depth of the continuous variable boundary profile at the tooth tip and is less than the depth of the continuous variable boundary profile at the corresponding tooth root.

Thus, the present invention provides many advantages over conventional composite powder forming techniques. As the final part comprises more than one powder metal material, each of the features (e.g., the ball tracks and splined area or the gear teeth and splined area) can be formed from a powder metal having material properties that are best suited for the particular demands of the feature. For example, the ball tracks can be made of a hard material to receive the bearing balls while the splined area can be made of a soft material that is better for formation of the splines. Unlike powder metal parts made from a single material, there is no conflict or tradeoff between the material properties of these features.

These and still other advantages of the invention will be apparent from the detailed description and drawings. The following is a description of some preferred embodiments of the present invention, which are not intended to be the only embodiments within the scope of the claims that define the invention.

DETAILED DESCRIPTION

Figure 2:
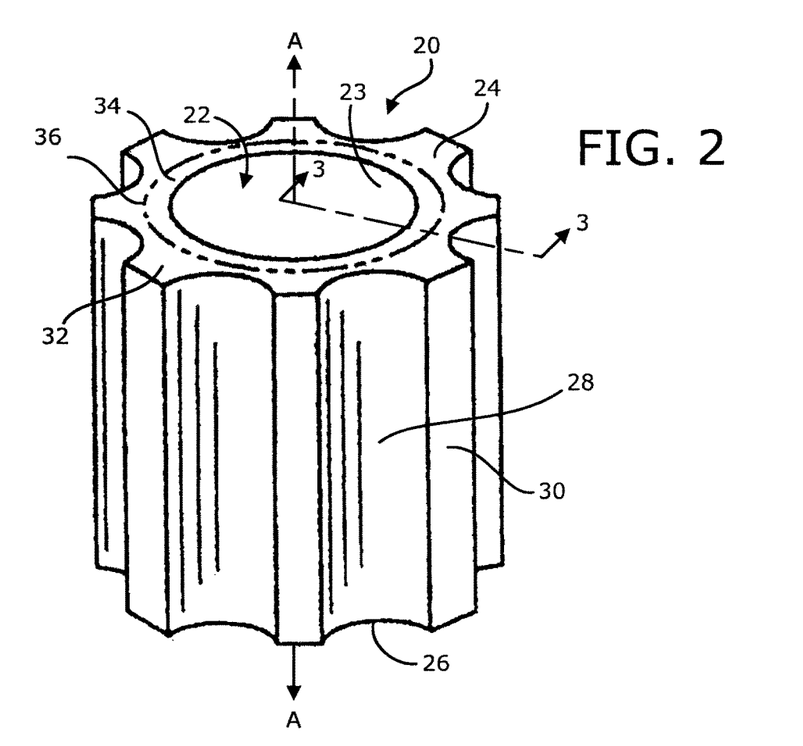
FIG. 2 shows a top front view of a composite preform made after compacting and sintering.
Figure 3:
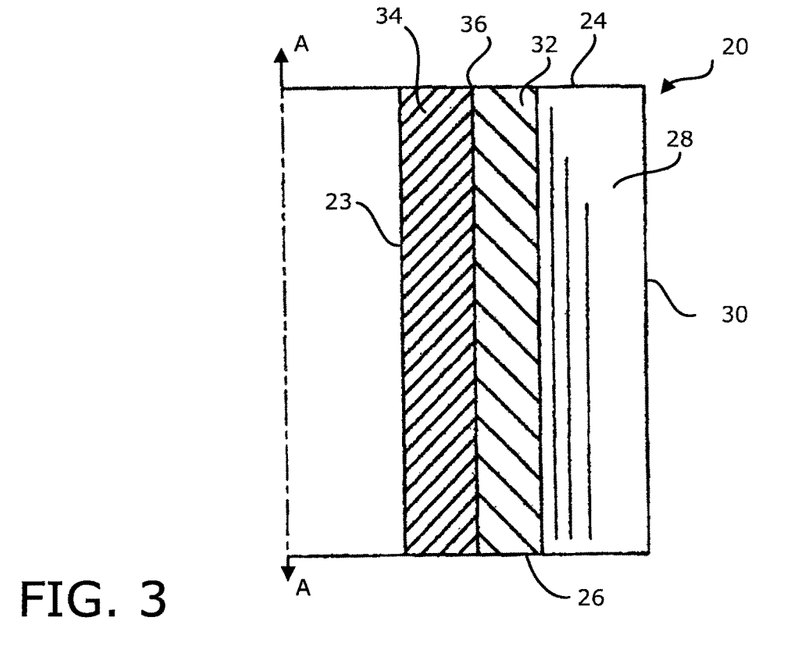
FIG. 3 shows a partial longitudinal cross-sectional view of the composite preform of FIG. 2 taken along line 3-3 of FIG. 2.

Referring first to FIGS. 2 and 3, a powder metal composite preform 20 is shown after compacting and sintering, but before forging. This composite preform 20 is a precursor to a final forged inner race for a constant velocity joint. As will be described in more detail below, the composite preform 20 is formed by sintering a composite preform compact. Therefore, it will be readily understood that the composite preform compact will have a shape and sections generally corresponding to those described for the composite preform 20, although for the composite preform compact the sections will be in the form of a compacted powder metal prior to sintering as opposed to a sintered powder metal as illustrated by the crosshatching in FIG. 3. Because compacted powder metal shrinks during sintering, the dimensions of the composite preform compact will be slightly greater than the dimensions of the composite preform 20 and, further, some small amount of dimensional distortion may occur during sintering.

The composite preform 20 is generally cylindrical in shape and extends along an axis A-A. An opening 22 defined by a radially inward facing inner surface 23 axially extends from a top face 24 to a bottom face 26 though the composite preform 20. On the outer surface of the composite preform 20, a plurality of pre-forged ball tracks 28 are formed. These pre-forged ball tracks 28 are concave and also extend from the top face 24 to the bottom face 26 of the composite preform 20. A plurality of pre-forged lands 30 separate the pre-forged ball tracks 28.

This composite preform 20 includes two portions made of different powder metal materials. The first portion 32 comprises a first powder metal material and includes the pre-forged ball tracks 28 and the pre-forged lands 30. The second portion 34 comprises a second powder metal material and includes a pre-forged inner race core around the axially-extending opening 22.

Between the first portion 32 and the second portion 34 is a boundary 36 demarcated by a change in the composition of the powder metal material. Outside of the boundary 36 in the first portion 32, the first powder metal material is in higher concentration than the second powder metal material. Inside of the boundary 36 in the second portion 34, the second powder metal material is in higher concentration than the first powder metal material. In one preferred form, there may be no second material outside of the boundary and no first material inside of the boundary. Although the boundary 36 is shown as a clear line in FIG. 3, it should be appreciated that there may be some mixing of the powders at the boundary 36 during the filling and compaction process. In the composite preform 20 shown, the boundary 36 has a shape approximating the curved face of a cylinder.

Figure 4:
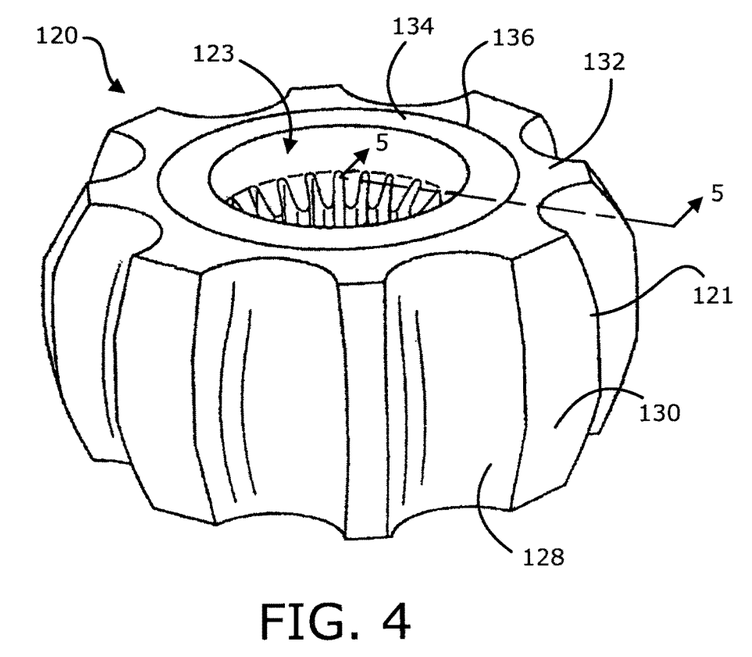
FIG. 4 shows a top front view of an CVJ inner race made from the composite preform of FIGS. 2 and 3.
Figure 5:
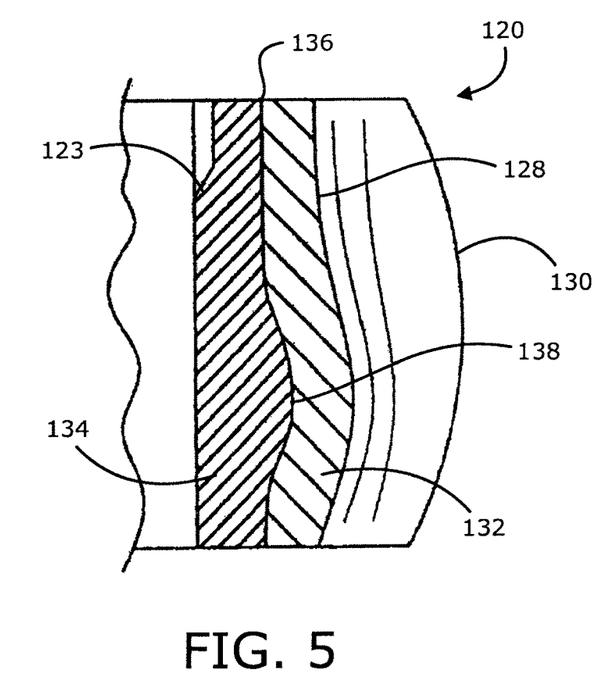
FIG. 5 shows a partial longitudinal cross-sectional view of the inner race shown in FIG. 4 taken along line 5-5.

Referring now to FIGS. 4 and 5, a forged inner race 120 made by forging the composite preform 20 is shown. During the forging process, the composite preform 20 is subjected to axial forces that reduce the axial height of the inner race 120 relative to the initial axial height of the composite preform 20 and induce the lateral flow of the sintered powder metal material in the forging die. As a result, the forged inner race 120 is shorter and the outer surface 121 is rounder than the composite preform 20. Moreover, forging will typically increase the density of the as-sintered materials because some amount of porosity usually exists in the as-sintered materials.

The forged inner race 120 has new or modified features in comparison to the composite preform 20. During the forging process or during subsequent cold sizing, a splined area 123 is formed in what was the inner surface 23 of the axially extending opening 22 or pre-forged inner race core of the composite preform 20. This splined area 123 may be shaped for connection to, for example, a shaft. Additionally, during the forging process, the pre-forged ball tracks 28 and the pre-forged lands 30 are shaped into ball tracks 128 and lands 130. As shown, the forged ball tracks 128 and lands 130 generally extend along an axial direction, are curved, and bow outward from the axis A-A near the mid-section of the forged inner race 120.

These ball tracks 128 can have a number of different configurations. For example, the ball tracks 128 of the forged inner race 120 may be configured for plunging or fixed styles of joint types. When viewed in longitudinal section as in FIG. 5, the ball tracks 128 can be curved in various configurations including widening toward one axial end of the forged inner race 120. If the ball tracks 128 are widened on the axial ends, then it is contemplated that the axial end (e.g., top end or bottom end) on which the ball tracks 128 are widened may alternate from one track to the next as one angularly traverses around the outer surface 121 of the forged inner race 120. The ball tracks 128 can also be angled with respect to the longitudinal axis of the part or the axis of rotation. Such tracks are common in cross-groove plunging joints, for example. However, for forged inner races that are to be used in constant velocity joints, the ball tracks 128 should be configured to provide a constant velocity plane for articulation.

Notably, the forged inner race 120 has an outer section 132 and an inner section 134 made from different powder metal materials which generally correspond to the materials used to make the pre-forged sections of the composite preform 20. The outer section 132 of the forged inner race 120, which includes the forged ball tracks 128 and lands 130, corresponds to the first portion 32 of the composite preform 20 and comprises the first powder metal material in higher concentration than the inner section 134. The inner section 134 of the forged inner race 120, which includes the splined area 123, corresponds to the second portion 34 of the composite preform 20 and comprises the second powder metal material in higher concentration than the outer section 132. The outer section 132 is integrally formed around the inner section 134 such that the forged inner race 120 is a unitary component formed from two separate powder metal materials, each having different characteristics as will be described in more detail below.

A variable boundary profile 136 extends between the outer section 132 and the inner section 134 of the forged inner race 120. The shape of the variable boundary profile 136 is a function of the initial shape of the boundary 36 in the composite preform 20 and the amount of lateral flow that occurs during the forging process. In general, the greater the localized amount of lateral flow during the forging process, the further the variable boundary profile 136 will be from the axis A-A in the forged inner race 120. For example, the tip or outermost circumferential portion 138 of the variable boundary profile 136 will be in an area of the forged inner race 120 that was subjected to the greatest amount of lateral flow during the forging process, as the boundary 36 in the composite preform 20 was radially equidistant from the axis A-A over the height of the composite preform 20.

The first powder metal material and the second powder metal material may be selected to have advantageous properties for the features of the forged inner race 120 formed of the respective powder metal materials. For example, as the outer section 132 has ball tracks 128 formed thereon that may be prone to wear, spalling, or brinnelling, it may be preferable that the first powder metal material be selected to be a material that is hard or that has high hardenability. As the inner section 134 has a splined area 123 formed therein, the second material may be preferably selected to be a material that is comparably soft to accommodate the forging of fine features or be a material that is easily machined so that fine machining, such as grading, can be preformed on the splined area 123. Preferably, the second powder metal material also provides impact resistance and shear resistance suitable for the application. In one form of the invention, the first powder metal material has a surface hardness of at least 58 HRC and the second powder metal material has a hardness of at most 43 HRC. In another form of the invention, the first powder metal material may be a material having a high hardenability such as a ferrous material having a carbon content of more than 0.5 wt %, while the second powder metal material may be a non-hardening material such as a ferrous material having a carbon content less than 0.3 wt %.

Figure 6:
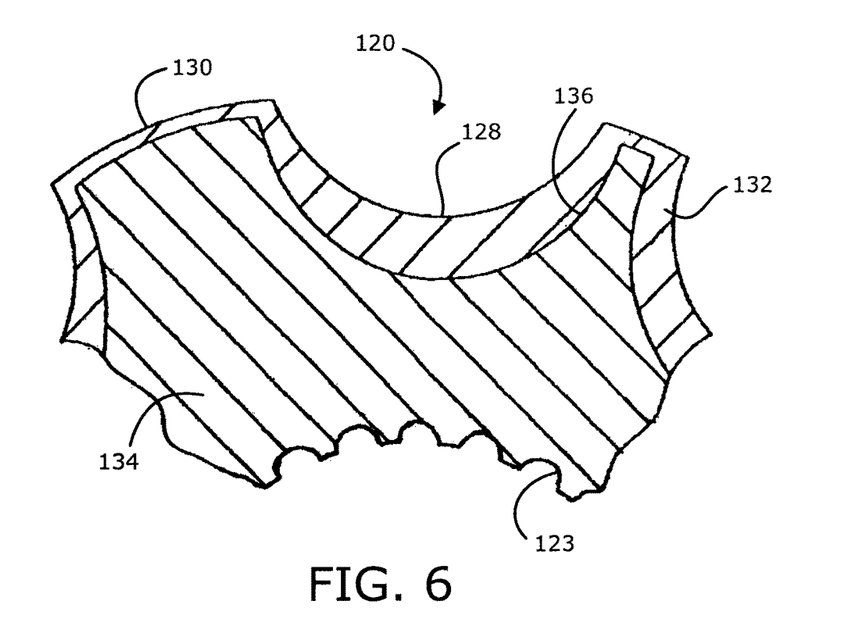
FIG. 6 shows a partial axial cross-sectional view of the CVJ inner race of FIG. 4.

Moreover, by controlling the shape of the variable boundary profile 136 during forging, it is possible to control the depth of the outer section 132 at various locations in the forged inner race 120. For example, with additional reference to FIG. 6 which shows a cross-sectional view taken perpendicular to the axis of rotation of the forged inner race 120, it is possible to achieve a deeper layer of the harder first powder metal material in the ball tracks 128 than in the lands 130 by variable forging. As it is typically desirable for the ball tracks 128 to have a hard surface that runs deep into the inner race 120 for wear resistance, this form of the variable boundary profile 136 places the hard material where it is most desired, while minimizing the amount of the harder material in the splined area 123 and lands 130, where this harder material may present problems during secondary operations such as machining.

Given a desired variable boundary profile 136 and forged inner race 120 shape, it is possible within limits to work backwards to determine an initial composite preform shape and forging die shape to achieve the desired variable boundary profile 136.

Also, additional or multiple material sections (i.e., two or more material sections) may be utilized in a preform in order to obtain multiple composite variable boundary profiles on select portions of a final forged part, thereby obtaining select performance features. For instance, a first material could be used in the region of the ball tracks to provide a hard surface, a second material could be used as the bulk of the of the part, and a third material could be used in the region of the splines to provide desired strength or machining properties.

Accordingly, a forged inner race for a constant velocity joint may include an outer section integrally formed around an inner section. The outer section can include a first powder metal material in a concentration higher than a second powder metal material and the inner section can include the second powder metal material in a concentration higher than the first powder metal material so as to provide a boundary profile between the inner and outer sections. The forged inner race may have an axis for rotation wherein, along a given plane that intersects the axis, a radial distance from the axis to the boundary profile varies along the length of the axis and a radial distance from the boundary profile to the outer surface of the outer section varies along the length of the axis. This boundary profile may be formed during a forging operation.

The outer surface may have a plurality of ball tracks formed therein and lands formed therebetween. The radial distance from the boundary profile to the outer surface of the outer section may be greater at the ball tracks than at the lands.

While the process is described with respect to a forged inner race 120 for a constant velocity joint, it is contemplated that a variable boundary profile 136 may be achieved on other parts such as an outer joint part for a constant velocity joint or other powder metal components.

Figure 7:
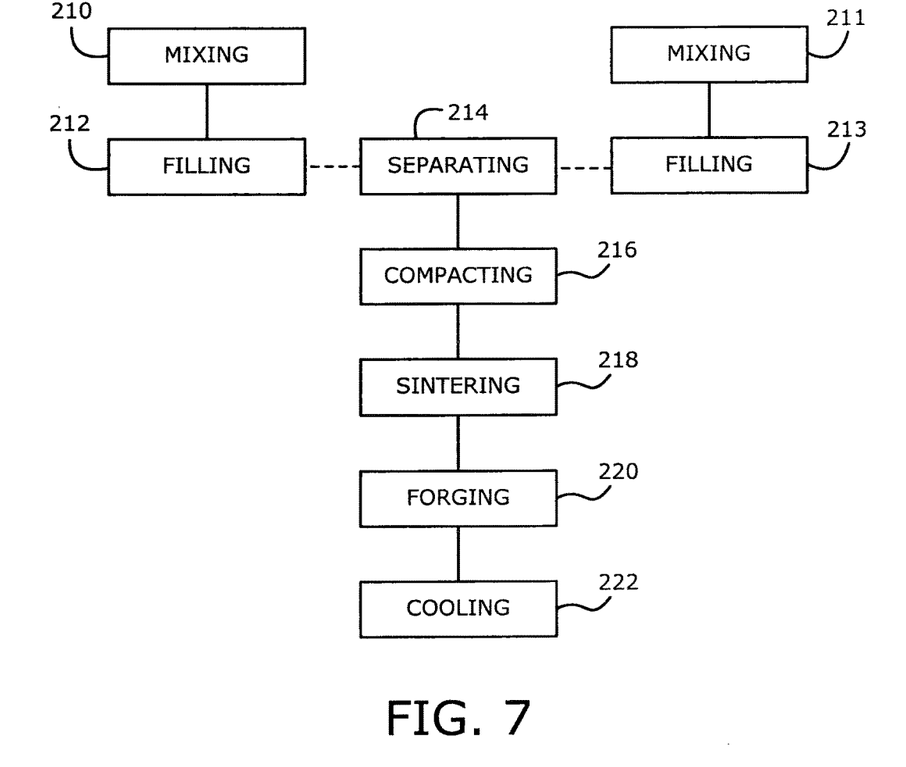
FIG. 7 shows an exemplary process for making the composite CVJ inner race.

Referring now to FIG. 7, one embodiment of a process or method is shown to make a forged inner race 120 having a variable boundary profile 136. For brevity, and because some of these process steps are known to those in the art of forging powder metals, only certain aspects of the inventive process are discussed below. In this regard, material selection, temperature processing, and compaction pressures are discussed only briefly.

Prior to compaction, the powder metal materials are separately prepared and then placed into a compaction form such as a tool and die set. The mixing steps 210 and 211 ready each powder metal material separately, including any needed binders or lubricants, by mixing the material until a nearly uniform mixture is achieved. Once mixed, each of the mixed powder metal materials are filled into the compaction form during the filling steps 212 and 213. These filling steps 212 and 213 may be simultaneous or sequential. An optional step of separating 214 may be included during the filling steps 212 and 213, thereby facilitating the desired powder metal material placement into the compaction form. The step of separating 214 may include using a separator or the like to define the portions of the compaction form filled during the filling steps 212 and 213. Once the powders are filled into the compaction form, this separator may be removed.

While two mixing steps 210 and 211 and two filling steps 212 and 213 are shown, it is recognized that additional mixing or filling may be performed for each additional material included.

After the filling of the die cavity or compaction form is complete, the metal powders are compacted according to a compacting step 216 within the die cavity or compaction form to create a composite preform compact (i.e., an unsintered powder metal component). The composite preform compact may have a shape and boundary similar to the composite preform 20 shown in FIGS. 2 and 3, albeit slightly larger as the compact will shrink during sintering. However, other shapes and boundaries may be formed during the compaction process by modifying the filling process and die cavity shape. Although not shown in the process flow, after the composite preform compact is compacted, the composite preform compact is ejected from the compaction form.

After the composite preform compact is formed, a sintering step 218 may be performed to form a composite preform from the composite preform compact. Typically, this sintering step 218 involves heating the composite preform compact to a temperature near, but below, the melting temperature of the powder metal component. As the composite preform compact comprises multiple different powder metal materials, the sintering temperature should generally be selected to be the lower of the sintering temperatures for these powder metals so as not to raise the other powder metal material(s) above its or their melting temperature(s). It is also possible that for certain components and/or compositions, liquid phase sintering may be employed and so solid state diffusion may not be the only mechanism by which sintering occurs.

Optionally, if one of the powder metal materials is conducive to carburization or "sint-carb" processing, as is know in the art, then the material may include a carburization step to achieve further beneficial results prior to the forging step. Notably, if sint-carb processing occurs prior to the forging step 220, then it is contemplated that the case depth of the carburized sections may be stretched during the lateral flow of forging, resulting in variable case depth thickness in the carburized surfaces.

Although not required, in some forms of the invention, the sintered composite preform may be separately carburized prior to forging by, for example, gas carburization. If carburized, it may be preferable to mask certain portions of the sintered composite preform to avoid their carburization (e.g., the splined area). Alternatively, if carburization of some features is preferred, while avoiding carburization of other features is also preferred, then the features to be carburized may be formed of a material that is easily carburized while the features that are desirably not carburized may be formed of a material that is less receptive to carburization.

A variable forging or forging step 220 comprises forging the composite preform at a forging temperature and a forging pressure to obtain an essentially dense, net shape, part. The variable boundary profile 136 is achieved by utilizing a die set of the forge with a form corresponding to the form of the inner race 120 to variably enhance the critical flow of the different powder metal portions of the composite preform 20 during the forging process. For example, for the composite preform 20 described above, the boundary 36 of the composite preform 20 is strategically compressed into the die sections, in which some portions of the composite preform 20 are stretched and thinned during the forging operation, while other portions of the composite preform 20 are thickened and deepened achieving the different powder metal zones from the composite preform 20. Prior to the forging process, a preheating step may be included wherein the composite preform 20 is heated to a pre-forge temperature to enhance the desired metal flow during the forging process.

It is contemplated that the step of forging may include oscillation of one or more of the tooling components used in the forging process. Oscillation of the components may help to induce lateral flow of the material and deform the material more readily than if only static forces are applied.

A cooling step 222 may be used to selectively harden certain features of the forged inner race 120 or obtain a particular metallurgy in one of the sections. For example, if a hardenable material is used to form the outer section, while a non-hardenable material is used to form the inner section, quenching the forged part immediately after the forging step 220 can result in the hardening of the outer section relative to the inner section. Cooling of the forged part may be by quenching in oil, water, air or by other methods suitable to the powder metal forging process.

In one aspect of the inventive process, the composite preform is directly quenched after forging to harden at least one of the powder metal materials. This quench can eliminate the need for a later carburizing step to provide the targeted hardness in the ball tracks 128, reducing cycle time for the part and costs associated with the longer cycle times and post-forging heating processes.

Prior to cooling, the forged part may be allowed to dwell for a period allowing for enhanced properties by allowing the material temperature to stabilize in the part. The appropriate length of dwell time will depend on a time-temperature-transformation chart for the material to be quenched, as different materials have different responses to different thermal treatments.

Further post forging operations may include, turning, facing, surface grinding, splining, and broaching of the product depending upon final specification requirements, thereby being ready for washing, packing, or shipping. Because of the multiple materials forming the inner race, the finish class of these steps can be improved. For example, a higher spline class is achievable for the spline because it can comprise the non-hardened second material. This can improve the fabrication process by reducing tool wear and reducing the failure of the component during secondary operations.

As compared to traditional methods of forging, hardening and machining inner joint parts, the disclosed process eliminates the steps of hard machining the ball tracks and outer land surfaces, and part washing. The resulting inner joint part has a high hardness and full material density in the regions of the ball tracks, and provides a deeper load bearing zone than in carburized steel. The part also exhibits a robust inner spline having a net shape spline and datum geometry. It can be cold sized after quenching, thereby eliminating any post-carburizing distortion and need for spline grading.

With proper combinations of powder metal, compaction forms, processing times, processing temperatures, processing pressures, forging dies, and cooling methods a near-net shape, fully dense components may be obtained having a variable boundary profile, thereby requiring minimal if any machining operations facilitating cost savings and performance improvements.

Figure 9:
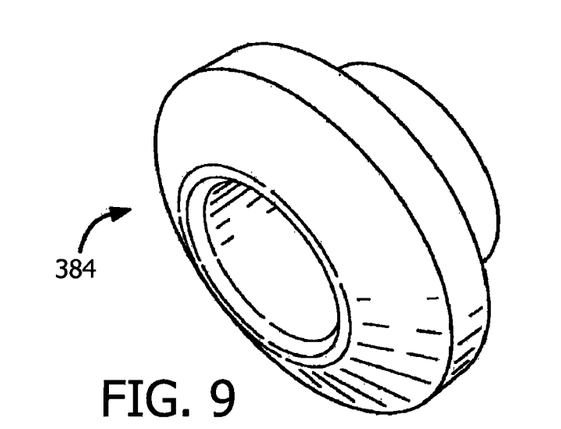
FIG. 9 shows a composite preform made after compacting and sintering used to obtain the composite bevel gear.

FIG. 9 shows an isometric view of a composite preform 384 made after compacting and sintering required to obtain the inventive product after forging in accordance with an embodiment of the invention.

Figure 10:
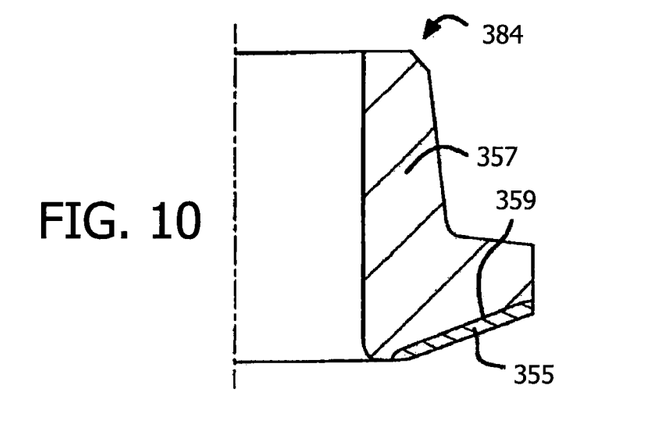
FIG. 10 shows a partial cross-sectional view of the composite preform of FIG. 9 having two materials.

FIG. 10 shows a partial cross-sectional view of the composite preform 384 of FIG. 9 having a two different powder metal materials. The preform 384 includes a first powder metal material 355 and a second powder metal material 357 separated by initial material boundary 359. The initial material boundary 359 is representative of the boundary between at least two materials obtained after a compacting process of strategically filled or placed powder metals into a compaction die. While the initial material boundary 359 is shown as a precise demarcation between the different materials 355, 357, the actual material boundary line will approximate the separation of the materials depending upon the filling process used to create the composite preform. The art of filling a compaction die with different powder metals to obtain a composite preform is known to those skilled in the art, but is only briefly introduced for an understanding of the invention presented herein.

Figure 11:
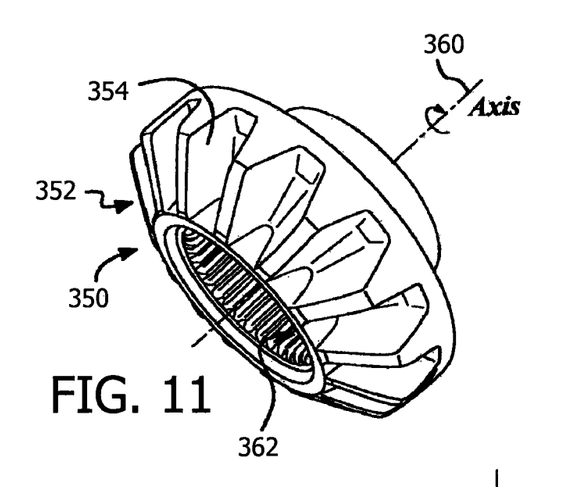
FIG. 11 shows a bevel gear in the form of a differential side gear made from the composite preform compact of FIG. 9.
Figure 13:
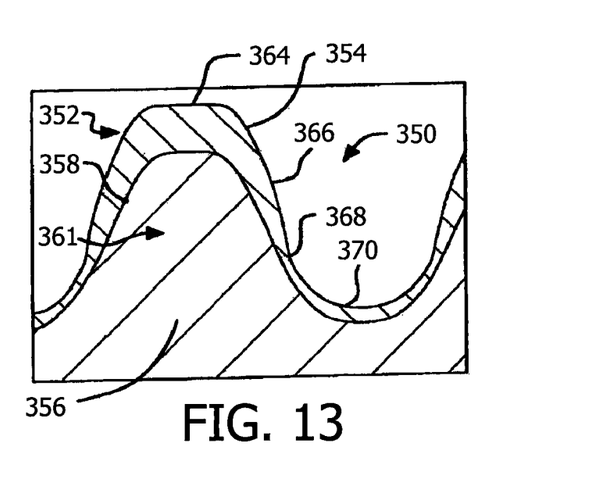
FIG. 13 shows a partial cross-sectional view of the differential side gear shown in FIG. 12.

FIG. 11 shows an isometric view of a differential side gear 350 made from the composite preform 384 of FIG. 9 in accordance with an embodiment of the invention. The differential side gear 350 includes plurality of teeth 352 having a variable boundary profile 358 as shown in FIG. 13. Each tooth of the plurality of teeth 352 has a surface 354 and a tooth core 356. The differential side gear 350 has a rotational axis 360, wherein the teeth 352 extend radially outward in the same general direction as the rotational axis of the gear, but are inclined with respect to the rotational axis. The differential side gear 350 further includes an axially splined internal section 362 axially aligned with the rotational axis 360. The differential side gear 350 is made by forging the composite preform 384.

Figure 12:
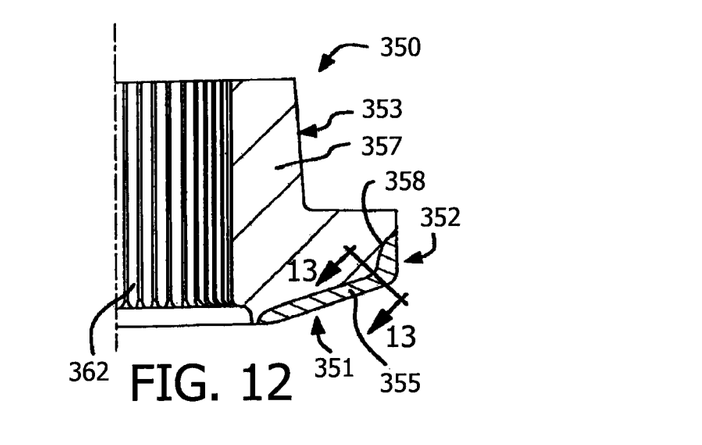
FIG. 12 shows a partial-cross sectional view of the differential side gear shown in FIG. 11.

FIG. 12 shows a partial-cross sectional view of the differential side gear 350 shown in FIG. 11. The differential side gear 350 after forging results in a first section 351 made from a first powder metal material 355, and second section 353 made from a second powder metal material 357. Also, the gear 350 includes a variable boundary profile 358 as shown in FIG. 13. The variable boundary profile 358 exhibits the performance properties mentioned above, while not necessarily being formed from a carburized zone, but being formed from the initial material boundary 359 created by the forging of the composite materials 355, 357. The variable boundary profile 358 in the gear exhibits improved tooth wear resistance or loading on the plurality of teeth 352 and improved impact or bending resistance in the gear core 356. Also, the second powder metal material 357 may be chosen advantageously to obtain preferential performance properties for the splines 362 of the gear 350 while advantageously maintaining the performance properties desired at the teeth 352.

Optionally, a composite material may be strategically utilized for each material section. Also, additional or multiple material sections may be utilized in a preform in order to obtain multiple composite variable boundary profiles on select portions of a final forged part or gear, thereby obtaining select performance features.

FIG. 13 shows a partial cross-sectional view of the differential side gear 350 shown in FIG. 12. The differential side gear 350 includes a composite variable boundary profile 358. The variable boundary profile 358 may be coincidental with the initial material boundary 359 in a particular cross-sectional view, such as that represented in FIG. 12, but the initial material boundary 359 is not determinative of the variable boundary profile 358 as shown in FIG. 13.

The surface 354 of the gear 350 includes a tip surface 364, a pitch line surface 366, a root fillet surface 368 and a root diameter or land surface 370. The variable boundary profile 358 is substantially represented by the effective boundary of: 2.4 mm at the tip surface; 1.9 mm at the pitch line surface; 0.4 mm at the root fillet surface; and 0.8 mm at the root land surface. While specific numbers are presented in the present embodiment, it is recognized that the variable boundary profile may have any non-constant effective boundary profile over a particular surface cross-section and is not limited to the specific profile here presented and is not intended to be limited by the example here given.

The variable boundary profile 358 may also be represented by a boundary ratio. The effective boundary ratio is given by comparing boundary depths measured at the tip surface 364 to the root fillet surface 368, the pitch line surface 366 to the root fillet surface 368, or the root land surface 370 to the root fillet surface 368. For example, the variable boundary ratio for the tip surface 364 to the root fillet surface 368 is 6:1, the pitch line surface 366 to the root fillet surface 368 is 19:4, and the root land surface 370 to the root fillet surface 368 is 2:1.

Advantageously, the boundary ratio may be 6:1 over the variable boundary profile 358 from the greatest depth to the shallower depth, thereby achieving greater mechanical properties such as tooth wear and impact resistance as desired.

Moreover, it is desirable to select a first powder metal material 355 for the first surface 354 of the teeth 352 achieving a surface hardness of at least 58 HRC in the forged gear. It also may be desirable to have a second powder metal material 357 in the gear core 356 having a hardness of not more than 43 HRC. In this regard, the second powder metal material is selected having effectively a non-hardening material such a low ferrous alloy steel having less than 0.2% carbon and the first powder metal material is a hardening material made from a different ferrous steel having a higher carbon content.

The variable boundary profile 358 advantageously provides a gear having greater tooth wear resistance on the surface 354 while providing impact resistance in the tooth root 356 or improved shear resistance in the spline 362. The variable boundary profile 358 is representative of the effective boundary profile achieved by strategic compaction forging of a preform. The variable boundary profile 358 resultantly achieved by the forging process as discussed herein.

While the process is described with respect to a differential side gear 350, it is anticipated that the variable boundary profile 358 may be achieved on other parts or gears, including bevel, differential or pinion gears, without limitation.

The differential side gear 350 may be made from a low alloy, fully compacted, ferrous powder metal material for one of the material portions. However, it is anticipated that the gear may be made of various other types of forged powder metal steels.

Figure 14:
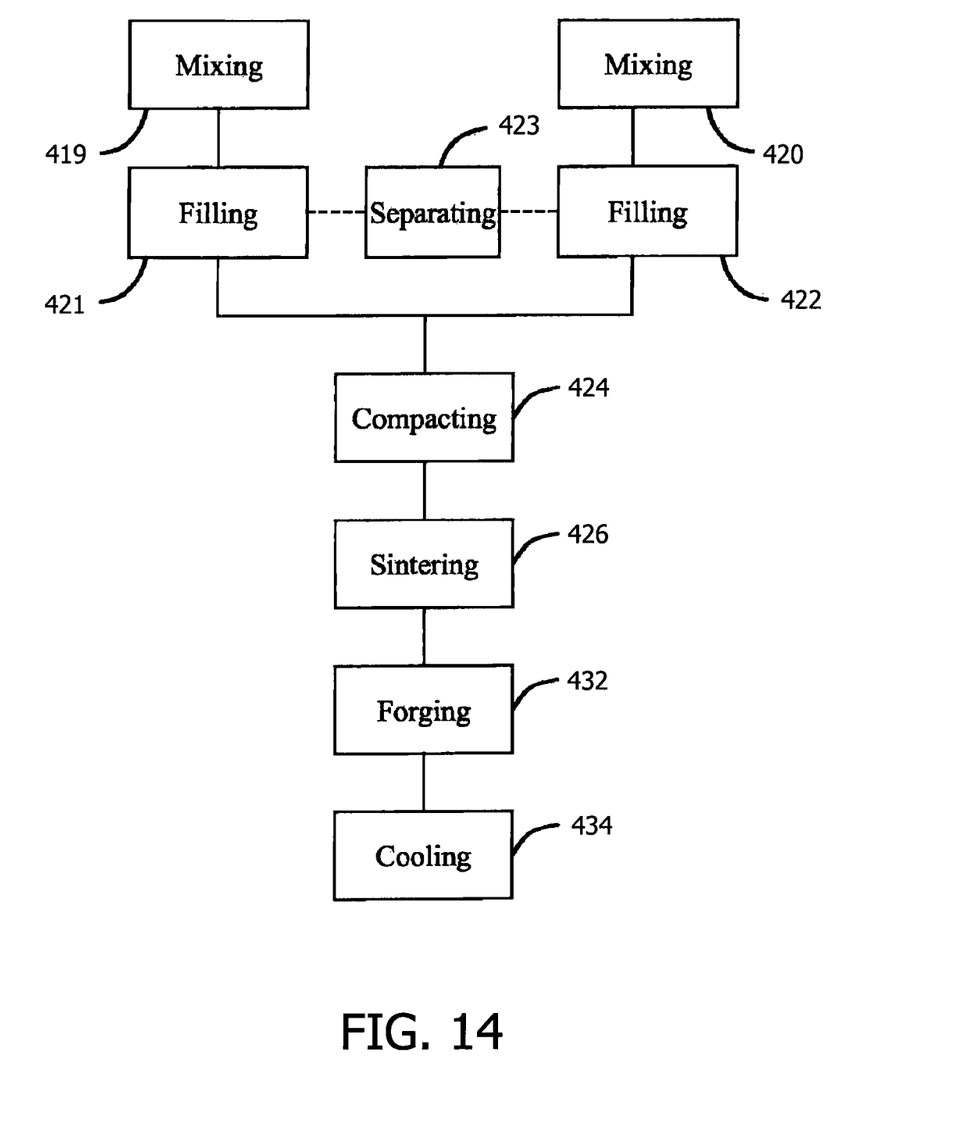
FIG. 14 shows a schematic layout of an embodiment of a process to obtain a composite powder metal variable boundary part.

Turning to the method of making the inventive variable boundary powder metal gear 350, FIG. 14 shows a schematic layout of an embodiment of a process according to the invention to obtain a composite powder metal variable boundary part. The process begins with step of mixing 419, 420, wherein each material is prepared for filling into a compaction form. Then the process continues with the step of filling 421, 422, wherein each material is strategically placed into the compaction form. Then after the filling step is completed the process continues with the steps of compacting 424, sintering 426, forging 432, and cooling 434. Post forging operations (not shown) may also be used to further enhance the gear. For brevity, and because some of these process steps are known to those in the art of forging powder metals, only certain aspects of the inventive process are discussed below. In this regard, material selection, temperature processing and compaction pressures are discussed only briefly.

The mixing step 419, 420 readies each metal powder, including any needed binders or lubricants, by mixing the material until a nearly uniform mixture is achieved ready for filling into a compacting form during the filling step 421, 422. An optional step of separating 423 may be included during the filling steps 421, 422 thereby facilitating the material placement into the compaction form. While two mixing steps 419 and 420, and two filling steps 421 and 422 are shown, it is recognized that additional mixing or filling are necessary for each additional material desired. The filling steps 421, 422 can be sequential such that the material 355 for the surface 354 of the outer section of the forged part is strategically placed in the preform prior to the material 357 for the pre-forged inner core 356, for example. In some cases, however, the filling steps 421, 422 may be simultaneous or nearly simultaneous.

The compacting step 424 includes the compaction of at least two different powder metal materials in a compaction form to obtain a preform. Before compacting, filling of a first portion of the compaction form with a first powdered metal material, then, with optional use of a separator 423, filling a second portion of the compaction form with a second powdered metal material. After the filling step of the die cavity is complete, the composite metal powders are compacted within the die cavity to form a preform compact. The preform compact includes at least one cross-sectional interface or boundary in which the final forged part resultantly obtains a variable boundary profile, as discussed herein. The process is then completed by sintering, forging and cooling steps to achieve a gear having a first section having the first powder metal material and a second section having the second powder metal material. It is noted that the first and second portions in the filling stage resulting in a preform, do not necessarily achieve the same boundary as a first and second sections of the final product.

The sintering step 426 may be accomplished as is known by a person of skill in the art. Optionally, if one of the composite materials is conducive to carburization or "sint-carb" processing, as is know in the art, then the material may include a carburization step to achieve further beneficial results prior to the forging process.

The variable forging or forging step 432 comprises forging the preform at a forge temperature and a forge pressure to obtain a substantially dense, net shape, part. The variable boundary profile for the gear results in nearly symmetrical profiles for each tooth because of the symmetrical nature of the forging process and the symmetrical nature of the preform. However, it is recognized that optional carburization steps or additional forging steps may be used to obtain multiple variable boundary profiles. The variable boundary profile is achieved by utilizing a die set of the forge to variably enhance critical flow of the different metal portions during the forging process. Essentially, the determined boundary of the composite powder metal preform is strategically compressed into the die sections, wherein some portions of the preform are stretched and thinned during forging and other portions of the preform are thickened and deepened achieving the different powder metal zones from the composite preform.

In one aspect, the forging step used to obtain the composite variable boundary profile is further enhanced by strategically forming the material boundary layer in the preform to enhance critical flow of the composite powder metal preform during the forging process.

The cooling step 434 allows the forged part to obtain a particular metallurgy resulting in a gear having the desired variable boundary profile. Cooling of the forged part may be by quenching in oil, water, air or by other methods suitable to the powder metal forging process.

Prior to cooling, an optional dwelling step may be included, allowing the forged part to dwell for a period allowing for enhanced properties by allowing the material temperature to stabilize in the part.

Optionally, a preheating step may be included wherein the preform is heated to a pre-forge temperature prior to forging to enhance the desired metal flow during the forging process.

Further, optional post forging operations may include, turning, facing, surface grinding, splining, and broaching of the product depending upon final specification requirements, thereby being ready for washing, packing, or shipping. Because of the multi-material work piece, the finish class of these steps can be improved. For example, a higher spline class is achievable for the spline 362 of FIG. 11 because of the non-hardened second material 357. This improves the entire machining system by improving the spline class, yet reducing tool wear.

With proper selection and combinations of powder metal, compaction forms, processing times, processing temperatures, processing pressures, forging dies, and cooling method a near-net shape, fully dense product may be obtained having the variable boundary profile, thereby requiring minimal if any machining operations facilitating cost savings and performance improvements.

While various process steps have been presented, they are intended only to be limited in scope or order as indicated in the claims of this invention. Further, while the invention has been described in connection with several embodiments, it should be understood that the invention is not limited to those embodiments. Thus, the invention covers all alternatives, modifications, and equivalents as may be included in the spirit and scope of the appended claims.

What is claimed is:

1. A method of making a forged composite powder metal part from at least two different powder metal materials, the method comprising:
  forming a composite preform compact from the at least two different powder metal materials by:
    filling a first portion of a compaction form with a first powder metal material;
    filling a second portion of the compaction form with a second powder metal material; and
    compacting the first powder metal material and the second powder metal material in the compaction form to form the composite preform compact, in which the first powder metal material at least partially forms an outer surface in a higher concentration than the second powder metal material and the second powder metal material at least partially forms a pre-forged core in a higher concentration than the first powder metal material; and
  sintering and forging the composite preform compact to form the forged composite powder metal part in which the forged composite powder metal part has an outer section comprising the first powder metal material in a higher concentration than the second powder metal material, the outer section having a plurality of axially-inclined features in at least a portion thereof which are forged therein, and an inner section comprising the second powder metal material in a higher concentration than the first powder metal material;
  wherein the step of forging creates a variable boundary profile in the plurality of axially-inclined features between the inner section and the outer section in which a radial distance from an axis of rotation of the forged composite powder metal part to the variable boundary profile varies over an axial length of the forged composite powder metal part and wherein the variable boundary profile is formed by variably enhancing the flow between different portions of the composite preform compact during the step of forging.

2. The method of claim 1, wherein:
  the forged composite powder metal part is an inner race for a constant velocity joint;
  the step of compacting includes forming a plurality of pre-forged ball tracks in the outer surface of the compaction preform compact; and
  during forging, the plurality of pre-forged ball tracks in the outer surface of the compaction preform compact are formed into a plurality of the ball tracks with land surfaces there between in the outer section of the composite powder metal part.

3. The method of claim 2, further comprising the steps of machining the plurality of the ball tracks and cold sizing a splined area of the inner section.

4. The method of claim 1, wherein the inner section and the outer section of the forged composite powder metal part have different hardness properties.

5. The method of claim 1, wherein the first powder metal material has a greater hardenability than the second powder metal material.

6. The method of claim 5, further comprising the step of quenching the forged composite powder metal part after forging to achieve the different hardness properties between the outer section and the inner section of the forged composite powder metal part.

7. The method of claim 1, wherein the first powder metal material has a greater carbon content than the second powder metal material.

8. The method of claim 1, further comprising a step of carburizing before forging.

9. The method of claim 8, further comprising masking at least a portion of the pre-forged core during the step of carburizing such that a resultant case depth in the outer surface exceeds a resultant case depth in the pre-forged core before forging.

10. The method of claim 1, wherein the step of compacting forms an axially-extending opening in the pre-forged core in the composite preform compact.

11. The method of claim 10, wherein the step of forging the composite preform compact includes forming a splined surface in the axially-extending opening.

12. The method of claim 1, wherein:

the forged composite powder metal part is a bevel gear having an axis of rotation extending through an axially-extending opening in the composite powder metal part; and during forging, a plurality of teeth are formed into the outer section of the forged composite powder metal part, the teeth being at least in part angularly inclined toward the axis of rotation.

13. The method of claim 1, wherein the composite preform compact has an initial material boundary between the first powder metal material and the second powder metal material and wherein the initial material boundary is variably shaped during the step of forging to form the variable boundary profile.

14. The method of claim 1, wherein, during the step of forging, some portions of the composite preform compact are stretched and thinned and other portions of the preform are thickened and deepened to create the variable boundary profile.

* * * * *